(12) United States Patent
Peng et al.

(10) Patent No.: US 7,701,703 B2
(45) Date of Patent: Apr. 20, 2010

(54) FIXING APPARATUS FOR HARD DISK DRIVE

(75) Inventors: Wen-Tang Peng, Taipei Hsien (TW); Wei-Chao Huang, Taipei Hsien (TW); Mo-Ming Yu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 108 days.

(21) Appl. No.: 11/963,868

(22) Filed: Dec. 24, 2007

(65) Prior Publication Data

US 2009/0059507 A1    Mar. 5, 2009

(30) Foreign Application Priority Data

Aug. 30, 2007    (CN) .................... 2007 1 0201524

(51) Int. Cl.
*G06F 1/16* (2006.01)

(52) U.S. Cl. ............... 361/679.33; 248/633; 364/708.1; 360/244.3

(58) Field of Classification Search .......... 248/618, 248/633; 361/679.26, 679.27, 679.3, 679.33, 361/679.35; 364/708.1; 439/638; 360/244.3
See application file for complete search history.

(56) References Cited

U.S. PATENT DOCUMENTS

| 7,016,190 B1* | 3/2006 | Chang .................... 361/679.33 |
| 2002/0067592 A1 | 6/2002 | Horiuchi et al. |
| 2006/0023413 A1 | 2/2006 | Lo et al. |
| 2006/0120170 A1 | 6/2006 | Chen et al. |
| 2007/0211422 A1* | 9/2007 | Liu et al. ..................... 361/685 |
| 2008/0278856 A1* | 11/2008 | Peng et al. ............... 360/244.3 |

FOREIGN PATENT DOCUMENTS

EP    0936850 A1    8/1999

* cited by examiner

*Primary Examiner*—Hung V Duong
(74) *Attorney, Agent, or Firm*—Frank R. Niranjan

(57) ABSTRACT

An exemplary fixing apparatus is for mounting a hard disk drive (HDD) having a plurality of holes defined in sidewalls thereof. The fixing apparatus includes a first bracket, and a second bracket. The first bracket includes a side plate, and a transverse member perpendicular to the side plate. The second bracket includes a side plate, and a transverse member perpendicular to the side plate. A free end of the transverse member of the second bracket pivotably engages with the transverse member of the first bracket. A free end of the transverse member of the first bracket is detachably locked to the transverse member of the second bracket. The side plates of the first bracket and the second bracket include a plurality of fixing members attached thereto to engage in the holes of the disk drive, respectively.

6 Claims, 4 Drawing Sheets

FIXING APPARATUS FOR HARD DISK DRIVE

CROSS-REFERENCES TO RELATED APPLICATION

Relevant subject matter is disclosed in the 6 co-pending U.S. patent applications (application Ser. Nos. 11/963,871, 11/963,869, 11/963,867, 11/963,864, 11/963,865, 11/963,870); filed on the same date and having a same title as the present application, which are assigned to the same assignee as this patent application. Relevant subject matter is also disclosed in the co-pending U.S. patent application Ser. No. 11/953,863, filed on Dec. 11, 2007, having a same title as the present application, which is assigned to the same assignee as this patent application.

BACKGROUND

1. Field of the Invention

The present invention relates to fixing apparatuses, and particularly to a fixing apparatus for hard disk drives (HDDs).

2. Description of Related Art

The conventional approach now being adopted to mount an HDD in a computer chassis generally involves placing the HDD in a holding area of a drive bracket; screwing a plurality of screws through side walls of the drive bracket into two sides of the HDD to fasten the HDD on the drive bracket; and mounting the HDD and the bracket in a computer chassis or a mobile HDD rack. For proper balanced installation of the HDD, multiple screws should be fastened at the same time, making installation and removal of the HDD tedious.

What is desired, therefore, is a fixing apparatus which allows convenient installation and removal of an HDD.

SUMMARY

An exemplary fixing apparatus is for mounting a hard disk drive (HDD) having a plurality of holes defined in sidewalls thereof. The fixing apparatus includes a first bracket, and a second bracket. The first bracket includes a side plate, and a transverse member perpendicular to the side plate. The second bracket includes a side plate, and a transverse member perpendicular to the side plate. A free end of the transverse member of the second bracket pivotably engages with the transverse member of the first bracket. A free end of the transverse member of the first bracket is detachably locked to the transverse member of the second bracket. The side plates of the first bracket and the second bracket include a plurality of fixing members attached thereto to engage in the holes of the disk drive, respectively.

Other advantages and novel features will become more apparent from the following detailed description when taken in conjunction with the accompanying drawings, in which:

DETAILED DESCRIPTION OF THE EMBODIMENT

Figure 1:
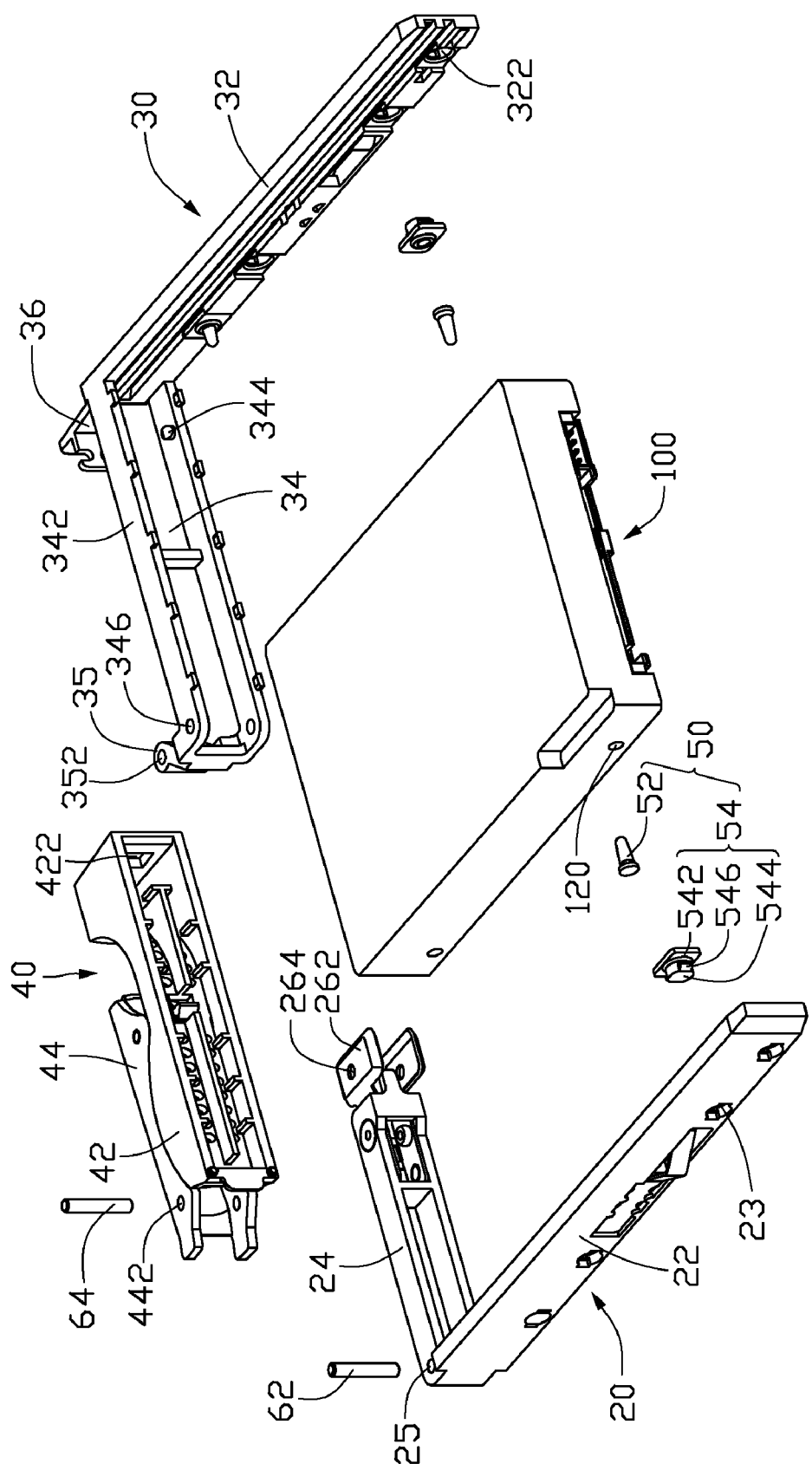
FIG. 1 is an exploded, isometric view of a fixing apparatus of an embodiment of the present invention together with an HDD.

Referring to FIG. 1, a fixing apparatus in accordance with an embodiment of the present invention is for fixing a hard disk drive (HDD) 100 and includes a first bracket 20, a second bracket 30, a bezel assembly 40, and two shafts 62, 64.

The HDD 100 includes a pair of holes 120 defined in each of two opposite sidewalls thereof.

Figure 2:
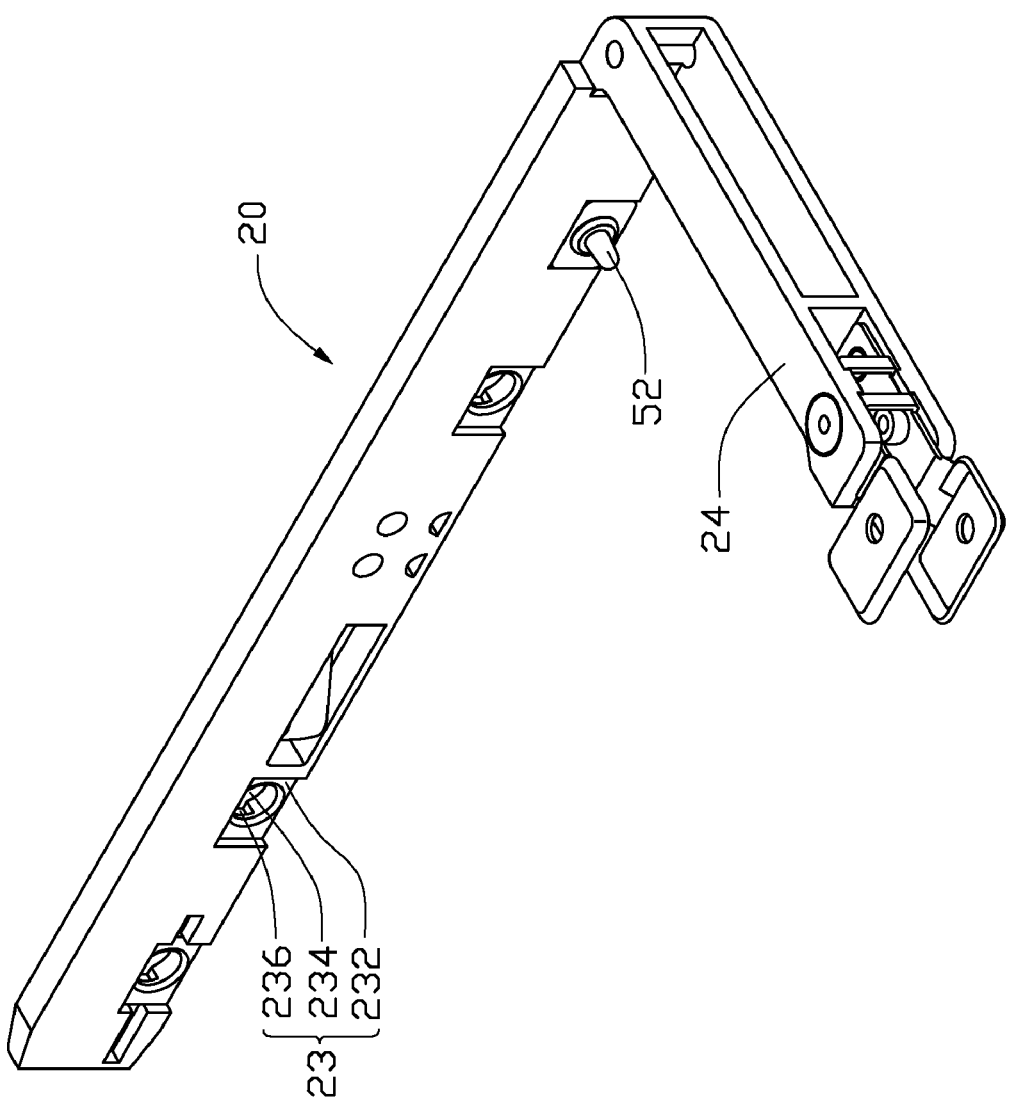
FIG. 2 is an enlarged, isometric view of a first bracket of the fixing apparatus of FIG. 1.

Referring also to FIG. 2, the first bracket 20 is generally L-shaped and includes a side plate 22, and a transverse member 24 perpendicular to the side plate 22. The transverse member 24 includes a pivoting hole 25 defined in an end portion near the side plate 22, and a pair of parallel spaced resilient tabs 262 extending from a distal free end thereof. Each of the resilient tabs 262 includes a through hole 264 defined therein. The side plate 22 includes a plurality of mounting holes 23 defined therein to retain a plurality of fixing members 50 therein. Each of the mounting holes 23 includes a rectangular recess 232, a cylindrical hole 234, and a pair of slots 236 extending oppositely from and in communication with the cylindrical hole 234 and opposite to each other.

The second bracket 30 is also generally L-shaped and includes a side plate 32, and a transverse member 34 perpendicular to the side plate 32. The transverse member 34 includes a pair of spaced horizontal plates 342. The horizontal plates 342 include a pair of posts 344 extending toward each other from inside surfaces thereof at end portions near the side plate 32 respectively, and a pair of pivoting holes 346 defined in free end portions thereof respectively. Each post 344 includes a sloping distal end. A pivoting portion 35 extends slantingly from the free end portions of the horizontal plates 342. A pivoting hole 352 is defined in the pivoting portion 35. An extension portion 36 extends forward from an end portion of the side plate 32 near the transverse member 34. A wedged block (not shown) extends outward from an outside surface of the extension portion 36. The side plate 32 includes a plurality of mounting holes 322 defined therein to retain a plurality of fixing members 50 therein. Each of the mounting holes 322 has a similar configuration as the mounting hole 23 of the first bracket 20.

The bezel assembly 40 includes a bezel 42, and a handle 44 pivotably engaging with the bezel 42. The handle 44 includes a pair of vertically aligned pivoting holes 442 respectively defined in an upper portion and a lower portion thereof. The bezel 42 includes a receiving space defined therein. A locking hole 422 is defined in an outside wall of the bezel 42 beside the receiving space to engage with the wedged block of the extension portion 36 of the second bracket 30.

Each of the fixing members 50 includes a cap 54, and a pin 52 with one end embedded in the cap 54. The pin 52 is made of metal. The cap 54 is made of shock absorbing material, such as rubber. Each cap 54 includes a rectangular portion 542, a cylindrical portion 544 perpendicularly extending from the rectangular portion 542, and a pair of wedged protrusions 546 extending oppositely from a circumferential wall of the cylindrical portion 544.

The fixing members 50 are attached to the side plate 22 of the first bracket 20, with the rectangular portions 542 of the caps 54 engaging in the rectangular recesses 232 of the side plate 22, the cylindrical portions 544 of the caps 54 engaging in the cylindrical holes 234 of the side plate 22, and the wedged protrusions 546 engaging in the slots 236 of the side plate 22. The fixing members 50 are also attached to the side plate 32 of the second bracket 30 in a same way as to the first bracket 20.

Figure 3:
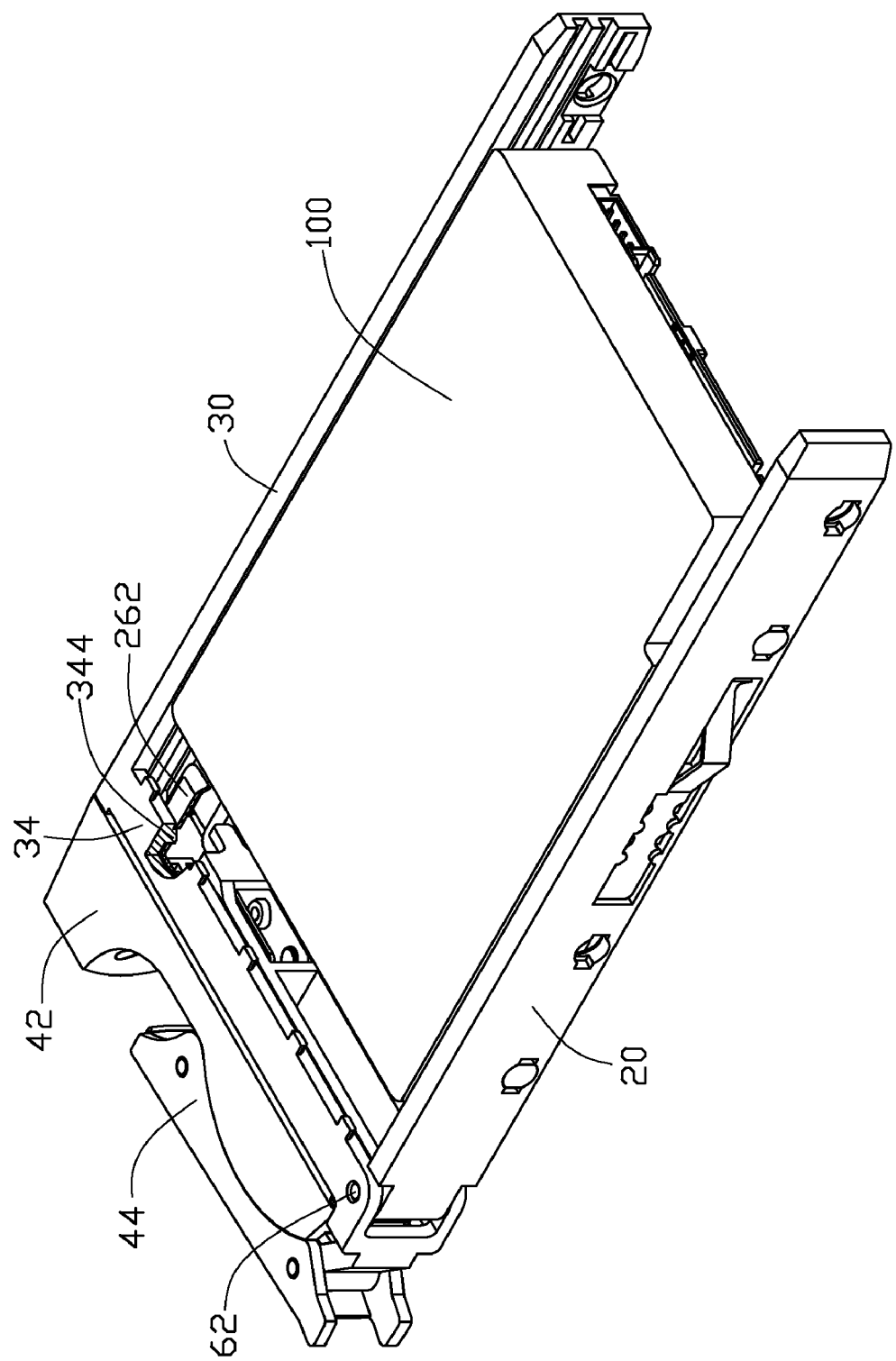
FIGS. 3 and 4 are assembled views of the fixing apparatus of FIG. 1, respectively showing the HDD in a locking position and a releasing position.
Figure 4:
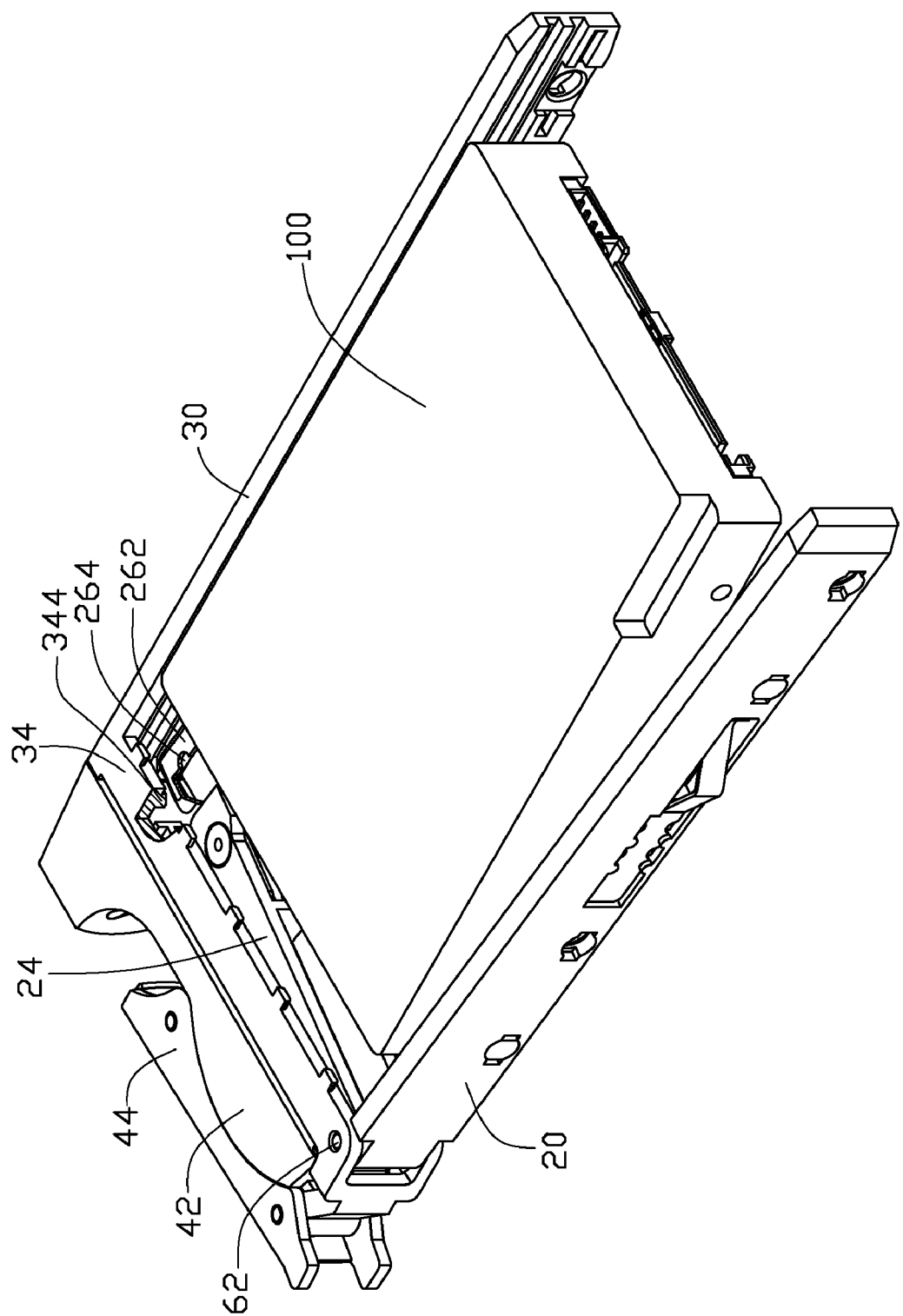

Referring also to FIGS. 3 and 4, in assembly, the first bracket 20 is pivotably attached to the second bracket 30, with the transverse member 24 of the first bracket 20 sandwiched between the horizontal plates 342 of the second bracket 30. The shaft 62 extends through the pivoting holes 346 of the second bracket 30 and the pivoting holes 25 of the first bracket 20. The posts 344 of the second bracket 30 releasably engage in the through holes 264 of the resilient tabs 262 of the first bracket 20. The bezel assembly 40 is pivotably attached to the second bracket 30. The pivoting portion 35 of the second bracket 30 is sandwiched between the upper portion and the lower portion of the handle 44 of the bezel assembly 40. The shaft 64 extends through the through pivoting holes 442 of the handle 44 of the bezel assembly 40 and the pivoting holes 352 of the pivoting portion 35 of the second bracket 30. The extension portion 36 of the side plate 32 of the second bracket 30 extends into the receiving space of the bezel 42 of the bezel assembly 40, with the wedged block engaging in the locking hole 422.

Referring also to FIG. 4, in use, the resilient tabs 262 of the first bracket 20 are squeezed toward each other to release the post 344 of the second bracket 30 from the through holes 264 of the resilient tabs 262. The first bracket 20 is pivoted about the shaft 62 so that the transverse member 24 of the first bracket 20 is moved away from the transverse member 34 of the second bracket 30 and the side plate 22 of the first bracket 20 is moved away from the side plate 34 of the second bracket 30 to allow the HDD 100 to be placed between the first bracket 20 and the second bracket 30. The pins 52 of the fixing members 50 of the second bracket 30 extend into the holes 120 of one sidewall of the HDD 10. Then, the first bracket 20 is pivoted to the HDD 100 so that the pins 52 of the first bracket 20 extend into the holes 120 of the other sidewall of the HDD 100. Thus, the HDD 100 is secured.

To release the HDD 100, the resilient tabs 262 of the first bracket 20 are squeezed each other toward to release the post 344 of the second bracket 30 from the through holes 264 of the resilient tabs 262. The first bracket 20 is pivoted about the shaft 62 away from the second bracket 30. The HDD 100 can then be easily removed.

It is believed that the present embodiments and their advantages will be understood from the foregoing description, and it will be apparent that various changes may be made thereto without deplateing from the spirit and scope of the invention or sacrificing all of its material advantages, the examples hereinbefore described merely being preferred or exemplary embodiments.

What is claimed is:

1. A fixing apparatus for fixing a hard disk drive (HDD) with a plurality of holes defined in sidewalls thereof, the fixing apparatus comprising:
   a first bracket comprising a side plate, and a transverse member perpendicular to the side plate;
   a second bracket comprising a side plate, and a transverse member perpendicular to the side plate, a free end of the transverse member of the second bracket pivotably engaging with the transverse member of the first bracket, a free end of the transverse member of the first bracket detachably locked to the transverse member of the second bracket; and
   a plurality of fixing members attached to the side plates of the first and the second brackets to engage in the holes of the HDD.

2. The fixing apparatus as claimed in claim 1, wherein the transverse member of the first bracket comprises a pivoting hole defined in an end portion near the side plate thereof, a pivoting hole is defined in the free end of the transverse member of the second bracket, a shaft extends through the pivoting holes of the second bracket and the first bracket.

3. The fixing apparatus as claimed in claim 1, wherein the transverse member of the second bracket comprises a pair of parallel spaced horizontal plates having a pair of posts extending toward each other from inside surfaces thereof respectively, the transverse member of the first bracket comprises a pair of resilient tabs extending from a distal free end thereof, a pair of through holes is respectively defined in the resilient tabs to engage with the posts.

4. The fixing apparatus as claimed in claim 3, wherein the post comprises a sloping distal end.

5. The fixing apparatus as claimed in claim 1, wherein each of the fixing members comprises a cap, and a pin with one end embedded in the cap.

6. The fixing apparatus as claimed in claim 5, wherein the cap comprises a rectangular portion, a cylindrical portion perpendicularly extending from the rectangular portion, and a pair of wedged protrusions extending oppositely from a circumferential wall of the cylindrical portion, the side plates comprise a plurality of mounting holes defined therein to retain the fixing members.

* * * * *